United States Patent
Hirota et al.

(10) Patent No.: US 7,706,615 B2
(45) Date of Patent: Apr. 27, 2010

(54) INFORMATION PROCESSING METHOD AND INFORMATION PROCESSING DEVICE

(75) Inventors: Makoto Hirota, Shibuya-ku (JP);
Toshiaki Fukada, Yokohama (JP);
Yasuhiro Komori, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 936 days.

(21) Appl. No.: 11/462,670

(22) Filed: Aug. 4, 2006

(65) Prior Publication Data
US 2007/0046645 A1    Mar. 1, 2007

(30) Foreign Application Priority Data
Aug. 12, 2005   (JP)   .............. 2005-234032

(51) Int. Cl.
*G06K 9/00* (2006.01)
*G10L 15/00* (2006.01)
(52) U.S. Cl. .............. 382/186; 382/187; 704/231; 704/235
(58) Field of Classification Search .............. 382/186, 382/187; 704/231, 235
See application file for complete search history.

(56) References Cited

U.S. PATENT DOCUMENTS

| | | | |
|---|---|---|---|
| 5,502,774 A | 3/1996 | Bellegarda et al. | |
| 7,496,513 B2 * | 2/2009 | Soong et al. | 704/260 |
| 2004/0057619 A1 * | 3/2004 | Lim et al. | 382/182 |
| 2004/0223646 A1 * | 11/2004 | Huang | 382/187 |
| 2005/0102138 A1 | 5/2005 | Mao | |

* cited by examiner

*Primary Examiner*—Jon Chang
(74) *Attorney, Agent, or Firm*—Canon U.S.A. Inc., I.P. Division

(57) ABSTRACT

In an information processing method for recognizing a handwritten figure or character, with use of a speech input in combination, in order to increase the recognition accuracy a given target is subjected to figure recognition and a first candidate figure list is obtained. Input speech information is phonetically recognized and a second candidate figure list is obtained. On the basis of the figure candidates obtained by the figure recognition and the figure candidates obtained by the speech recognition, a most likely figure is selected.

10 Claims, 16 Drawing Sheets

| START | 00:00:04:08 | | |
|---|---|---|---|
| END | 00:00:05:20 | | |
| CANDIDATE | FIRST | FIGURE TYPE | ELLIPSE |
| | | CERTAINTY | 60 |
| | SECOND | FIGURE TYPE | QUADRANGLE |
| | | CERTAINTY | 50 |
| | THIRD | FIGURE TYPE | TRIANGLE |
| | | CERTAINTY | 20 |

FIG. 8

| START | 00:00:05:10 (801) | | |
|---|---|---|---|
| END | 00:00:06:20 (802) | | |
| CANDIDATE | FIRST | FIGURE TYPE | TRIANGLE |
| | | CERTAINTY | 70 |
| | SECOND | FIGURE TYPE | QUADRANGLE |
| | | CERTAINTY | 60 |
| | THIRD | FIGURE TYPE | ELLIPSE |
| | | CERTAINTY | 10 |

| COMPREHENSIVE EVALUATION | FIRST | FIGURE TYPE | QUADRANGLE |
|---|---|---|---|
| | | CERTAINTY | 110 |
| | SECOND | FIGURE TYPE | TRIANGLE |
| | | CERTAINTY | 90 |
| | THIRD | FIGURE TYPE | ELLIPSE |
| | | CERTAINTY | 70 |

| START | 00:00:04:80 | | |
|---|---|---|---|
| END | 00:00:05:20 | | |
| CANDIDATE | FIRST | CHARACTER | 監 MONITOR (KAN, KEN) |
| | | CERTAINTY | 70 |
| | SECOND | CHARACTER | 蘭 ORCHID (RAN) |
| | | CERTAINTY | 50 |
| | THIRD | CHARACTER | 藍 INDIGO (AI, RAN) |
| | | CERTAINTY | 40 |

| START | 00:00:05:10 | | |
|---|---|---|---|
| END | 00:00:06:20 | | |
| CANDIDATE | FIRST | READING | EI |
| | | CERTAINTY | 60 |
| | SECOND | READING | AI |
| | | CERTAINTY | 55 |
| | THIRD | READING | SAI |
| | | CERTAINTY | 30 |

- 2001: 00:00:05:10 / 00:00:06:20 column
- 2002: right column bracket
- 2003: candidate rows bracket

FIG. 21

| COMPREHENSIVE EVALUATION | FIRST | CHARACTER | 藍 INDIGO |
|---|---|---|---|
| | | CERTAINTY | 95 |
| | SECOND | CHARACTER | 監 MONITOR |
| | | CERTAINTY | 90 |
| | THIRD | CHARACTER | 蘭 ORCHID |
| | | CERTAINTY | 68.3 |

INFORMATION PROCESSING METHOD AND INFORMATION PROCESSING DEVICE

BACKGROUND OF THE INVENTION

1. Field of the Invention

The present invention relates to an information processing method of performing a process on input information such as a character or a figure. In particular, the invention relates to a technology for improving a recognition rate of an input character, figure, or the like.

2. Description of the Related Art

A handwritten character or figure can be input to a device provided with a screen capable of accepting direct input by a pen or a stylus. Examples of such a device include a touch screen, an electronic whiteboard, a PDA with a touch panel, and a tablet PC. With this device, natural input can be achieved as if a handwritten character or figure is drawn on a sheet of paper or a whiteboard. If a technology related to a handwritten character recognition or figure recognition is integrated with the device, stroke information generated by the handwriting can be converted into digital data in the form of text or the like, whereby it is possible to use the data for various subsequent processes.

Meanwhile, as speech recognition technology has been developed and hardware performance has been improved, it is becoming possible to input speech not only to a PC or a work-station but also to various computer control devices.

In such circumstances, instead of employing the pen input alone or the speech input alone, there is proposed a technology for promoting operational efficiency through plural mode input by using the pen and the speech in combination. In this technical field, the term multimodal is sometimes used to denote input using two or more different modes. Japanese Patent Laid-Open No. 06-085983 suggests a system in which by drawing a figure through handwriting with a pen and pronouncing a type of the figure at the same time, the handwritten figure is shaped and displayed.

The handwriting input and the speech input both have the merit of achieving intuitive input, but have a demerit of "false recognition". For example, a case will be considered in which a user draws a figure through handwriting and a figure recognition process is applied to the drawing for automatic shaping. Even when the user had an intention to draw "quadrangle", the figure may be recognized as "circle" by false recognition and shaped into a circle to be displayed. In contrast to this, according to Japanese Patent Laid-Open No. 06-085983, when the user draws a figure and pronounces the figure type at the same time, the pronunciation is phonetically recognized to identify the figure type, so that the input figure is shaped in accordance with the identified figure type. However, the speech recognition also suffers from false recognition. Even when the user pronounces "quadrangle", if the pronunciation is recognized as "triangle", the figure is shaped into a triangle and displayed, so improper shaping unintended by the user is performed. That is, there is a problem in that the system aim cannot be achieved with false recognition.

In this case, the particular example of using the figure recognition and the speech recognition is taken for the description, but pattern recognitions such as character recognition, face recognition, and gesture recognition also have the same problems.

SUMMARY OF THE INVENTION

The present invention has been made in view of the above-mentioned problems to improve the recognition accuracy of information such as an input character or figure.

To solve the above-mentioned problems, according to an aspect of the present invention, there is provided an information processing device, including: a figure recognition unit adapted to obtain a figure candidate through figure recognition performed on a given target; a speech recognition unit adapted to obtain a figure candidate through speech recognition performed on input speech information; and a selection unit adapted to select a figure on the basis of the figure candidate obtained by the figure recognition unit and the figure candidate obtained by the speech recognition unit.

In addition, to solve the above-mentioned problems, according to another aspect of the present invention, there is provided an information processing device, including: a character recognition unit adapted to obtain a character candidate through character recognition performed on a given target; a speech recognition unit adapted to obtain a character candidate through speech recognition performed on input speech information; and a selection unit adapted to select a character on the basis of the character candidate obtained by the character recognition unit and the character candidate obtained by the speech recognition unit.

In addition, to solve the above-mentioned problems, according to another aspect of the present invention, there is provided an information processing method, including: a figure recognition result obtaining step of obtaining a figure candidate that is a result of performing figure recognition on a given target; a speech recognition result obtaining step of obtaining a figure candidate that is a result of phonetically recognizing speech information; and a selection step of selecting a figure on the basis of the figure candidate obtained in the figure recognition result obtaining step and the figure candidate obtained in the speech recognition result obtaining step.

In addition, to solve the above-mentioned problems, according to another aspect of the present invention, there is provided an information processing method, including: a character recognition result obtaining step of obtaining a character candidate that is a result of performing character recognition on a given target; a speech recognition result obtaining step of obtaining a character reading candidate that is a result of phonetically recognizing speech information; and a selection step of selecting a character on the basis of the character candidate obtained in the character recognition result obtaining step and the character reading candidate obtained in the speech recognition result obtaining step.

Further features of the present invention will become apparent from the following description of exemplary embodiments with reference to the attached drawings.

BRIEF DESCRIPTION OF THE DRAWINGS

FIG. 8 shows an example of a recognition result from the speech recognition unit according to the first embodiment.

FIG. 9 shows an example of a comprehensive evaluation made by the comprehensive evaluation unit according to the first embodiment.

FIG. 20 is a diagram for showing an operation of the speech recognition unit according to the second embodiment.

FIG. 21 shows an example of comprehensive evaluation made by the comprehensive evaluation unit according to the second embodiment.

DESCRIPTION OF THE EMBODIMENTS

Hereinafter, preferred embodiments of the present invention will be described, by way of example only, with reference to the drawings.

First Embodiment

In this embodiment, a description will be given of an example in which a figure is drawn by a pen and the figure type is pronounced at the same time to shape the input figure to be displayed on an information processing device provided with a large touch screen that may be used in a situation such as a conference.

Figure 1:
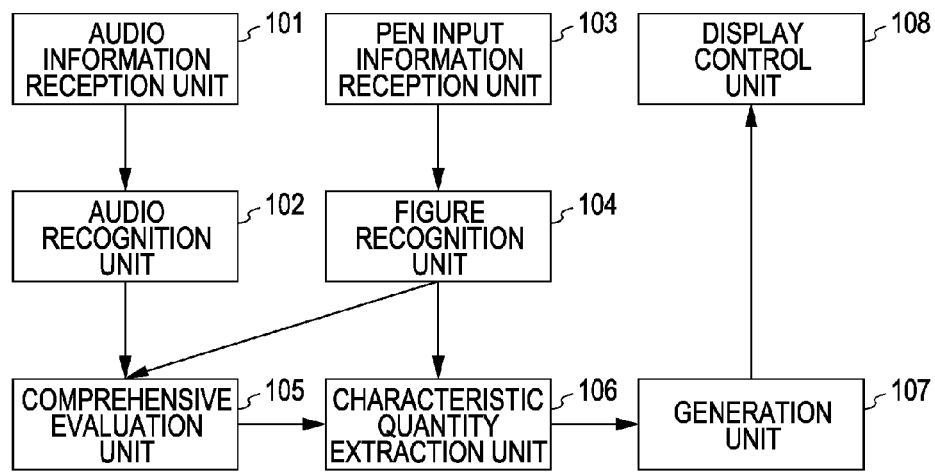
FIG. 1 is a block diagram of an input process in an information processing device according to a first embodiment of the present invention.

FIG. 1 is a block diagram of an input process in the information processing device according to the first embodiment. In this drawing, reference numeral 101 denotes a speech information reception unit for receiving speech information. Reference numeral 102 denotes a speech recognition unit for phonetically recognizing the received speech information. Reference numeral 103 denotes a pen input information reception unit for receiving pen input information. Reference numeral 104 denotes a figure recognition unit for recognizing a figure on the basis of received coordinate information. Reference numeral 105 denotes a comprehensive evaluation unit for selecting the figure through a comprehensive evaluation of the speech recognition result and the figure recognition result. Reference numeral 106 denotes a characteristic quantity extraction unit for extracting a characteristic quantity from the pen input information received by the pen input information reception unit 103. Reference numeral 107 denotes a generation unit for generating the figure selected by the comprehensive evaluation unit on the basis of the characteristic quantity extracted by the characteristic quantity extraction unit 106. Reference numeral 108 denotes a display control unit for performing a control so as to display the figure or the like which is generated by the generation unit 107.

Figure 2:
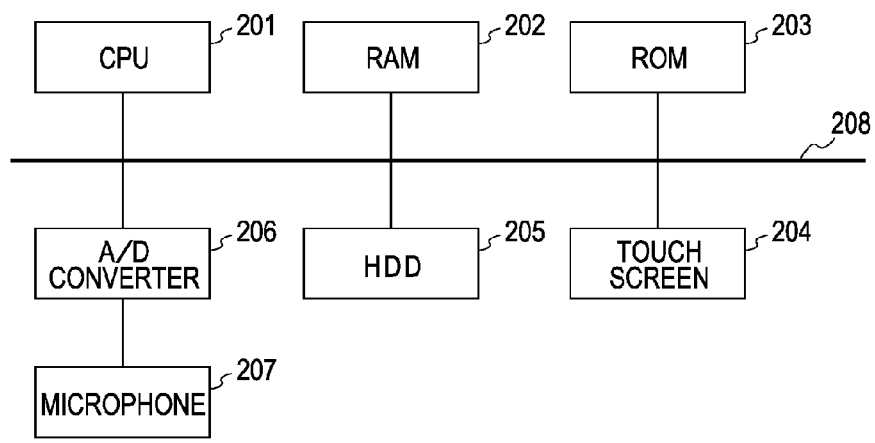
FIG. 2 is a hardware configuration diagram of the information processing device according to the first embodiment.

FIG. 2 is a hardware configuration diagram of the information processing device according to this embodiment. In this drawing, reference numeral 201 denotes a CPU for controlling the input process in accordance with a program for executing an operation procedure of the information processing device, which will be described below. Reference numeral 202 denotes a RAM for providing a storage area necessary for the operation of the above-mentioned program. Reference numeral 203 denotes a ROM for holding the program and the like. Reference numeral 204 denotes a touch screen to which inputs by a pen and a finger can be performed. The pen input information reception unit 103 receives the pen input information input on the touch screen 204. Also, the display control unit 108 controls the touch screen 204 to display the above-mentioned figure and the like. Reference numeral 205 denotes a hard disc drive (HDD) for holding the program and the like. The program to be executed in this embodiment may be the program held in the ROM 203 or the program held in the HDD 205. In addition, the program may be divided and held in the ROM 203 and the HDD 205, and executed by referring to both the programs. Reference numeral 206 denotes an A/D converter for converting the input speech into a digital signal. Reference numeral 207 denotes a microphone for receiving the speech. Reference numeral 208 denotes a bus.

Figures 6, 7:
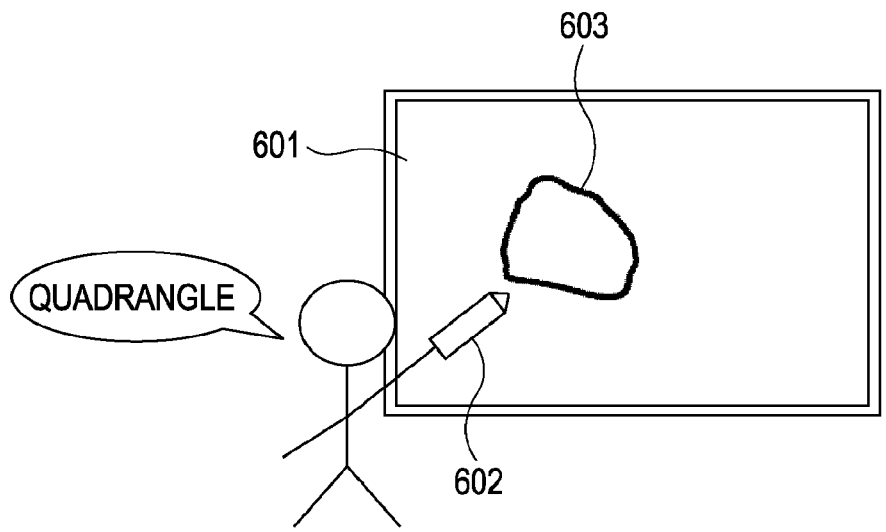
FIG. 6 shows a case in which a user draws a figure through handwriting on a touch screen and performs a speech input at the same time according to the first embodiment.
FIG. 7 shows an example of a recognition result from the figure recognition unit according to the first embodiment.

In this embodiment, as shown in FIG. 6, a case will be considered in which the user draws a handwriting stroke 603 on a touch screen 601 with use of a pen 602 and pronounces "quadrangle" at the same time. The operation of the information processing device having the above-mentioned configuration will be described below with reference to a flowchart.

Figure 3:
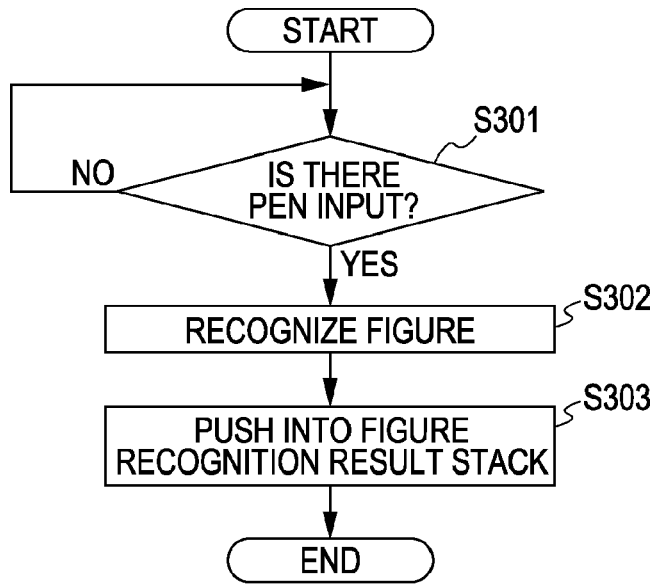
FIG. 3 is a flowchart for showing an operation of a figure recognition unit according to the first embodiment.

FIG. 3 is a flowchart for showing the operations of the pen input information reception unit 103 and the figure recognition unit 104. A program for executing the flowchart is held in the ROM 203 or the HDD 205 and executed under the control of the CPU 201.

First, it is checked whether or not there is pen input from the user to the touch screen 204 (S301). When there is pen input, the pen input information is received by the pen input information reception unit 103, and the figure recognition unit 104 recognizes a figure on the basis of the received pen input information (S302). The recognition result is pushed into a figure recognition result stack that is not shown in the drawing (S303). The figure recognition result stack is stored in the RAM 202 or the HDD 205. FIG. 7 shows an example of the figure recognition result pushed into the figure recognition result stack. In this manner, the figure recognition result includes pen input start and end time stamps (701, 702) and an N-best candidate 703 indicating a figure type with a confidence score (in this case, N=3). The confidence score can be found out by a known method. Any method may be used as long as the method can find out the same concept as the confidence score, such as dissimilarity.

Figure 4:
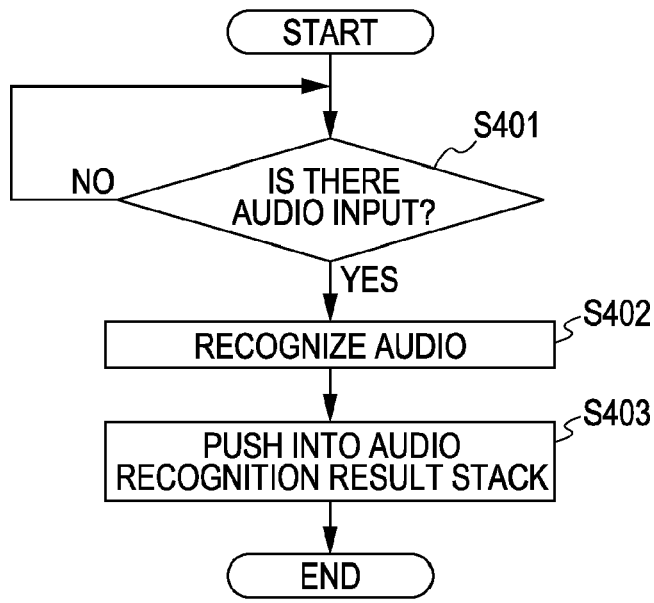
FIG. 4 is a flowchart for showing an operation of a speech recognition unit according to the first embodiment.

FIG. 4 is a flowchart for showing the operations of the speech information reception unit 101 and the speech recognition unit 102. A program for executing the flowchart is held in the ROM 203 or the HDD 205 and executed under the control of the CPU 201.

First of all, the speech information reception unit checks whether or not there is speech input from the user (S401). Detection of the speech input is a known technology and, for example, the detection is determined on the basis of the magnitude of the input speech power or the like. When there is speech input, the speech input is received and phonetically recognized (S402). After that, the recognition result is pushed into a speech recognition result stack not shown in the drawing (S403). The speech recognition result stack is held in the RAM 202 or the HDD 205. FIG. 8 shows an example of the speech recognition result pushed into the speech recognition result stack. In this manner, the speech recognition result includes pronunciation start and end time stamps (801, 802) and an N-best candidate 803 indicating a figure type with a confidence score (in this case, N=3). The speech recognition confidence score can be found out by a known method.

Figure 5:
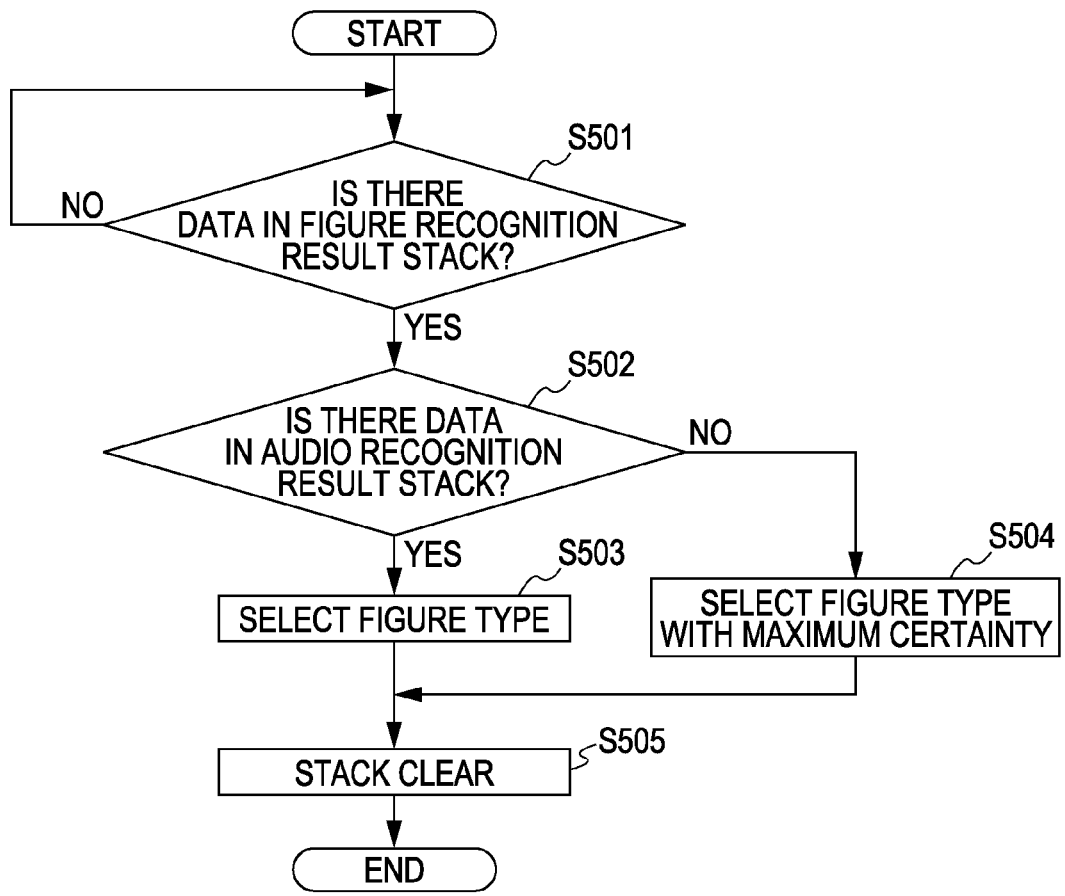
FIG. 5 is a flowchart for showing an operation of a comprehensive evaluation unit according to the first embodiment.

FIG. 5 is a flowchart for showing the operation of the comprehensive evaluation unit 105. A program for executing the flowchart is held in the ROM 203 or the HDD 205 and executed under the control of the CPU 201.

The comprehensive evaluation unit 105 monitors the figure recognition result stack to check whether or not any figure recognition result is held in the stack (S501). When the figure recognition result is held, it is checked whether or not a speech recognition result corresponding to this figure recognition result is held in the speech recognition result stack (S502). Herein, the figure recognition result stack may be monitored all the time or checked periodically. Also, the speech recognition result stack may be monitored instead of the figure recognition result stack. In that case, the orders of S501 and S502 are reversed.

Figure 10:
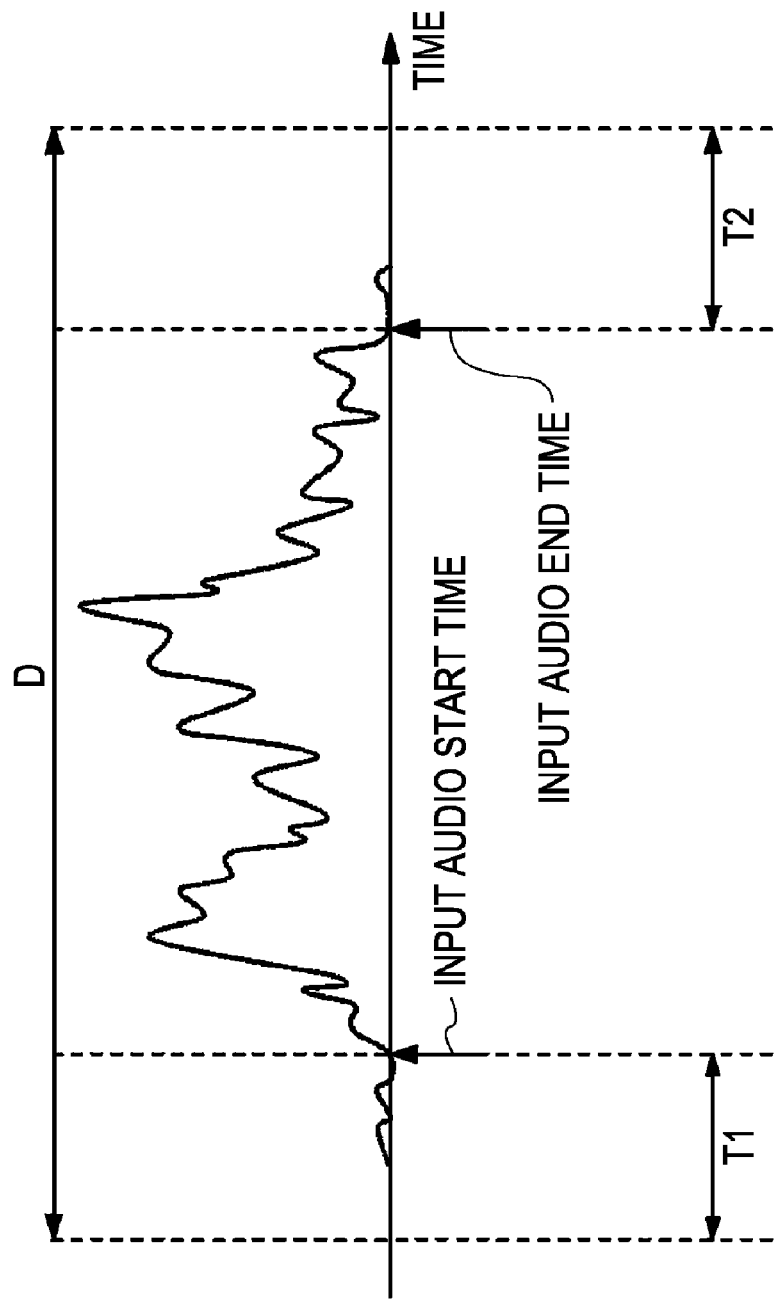
FIG. 10 is a graph showing a time interval that should include a pen input corresponding to a speech input according to the first embodiment.

The determination as to whether or not the speech recognition result corresponds to the figure recognition result is firstly made, for example, on the basis of the time stamps. To be specific, as illustrated in FIG. 10, if the pen input start time stamp 701 or the pen input end time stamp 702 of the figure recognition result is included in a period D spanning from T1 seconds before the speech start time to T2 seconds after the end time, the speech recognition result and the figure recognition result are associated with each other. In this case, a description will be given while assuming that the speech recognition result of FIG. 8 corresponds to the figure recognition result of FIG. 7.

When the speech recognition result corresponding to the figure recognition result is found, among one or plural figure types in the figure recognition result and one or plural figure types in the speech recognition result, certainties of matching figure types are summed. In FIGS. 7 and 8, the confidence score of 60 for ellipse that is the figure recognition result and the confidence score of 10 for ellipse that is the speech recognition result are summed and 70 is obtained. The certainties for triangle and quadrangle are 90 and 110, respectively. Then, the figure type with the maximum value of the summed confidence score is selected (S503). In this case, quadrangle with the maximum summed confidence score is selected. It should be noted that in S502, if there are no corresponding speech recognition results, a figure with the maximum confidence score is selected among one or plural figure types in the figure recognition result (S504). As in the above-mentioned manner, the process for selecting one figure among one or plural figure types in the figure recognition result is completed, and the figure recognition result stack and the speech recognition result stack are all cleared (S505). As the result of the above-mentioned process, the figure type is determined as "quadrangle" on the basis of the comprehensive evaluation result as shown in FIG. 9.

Figure 11:
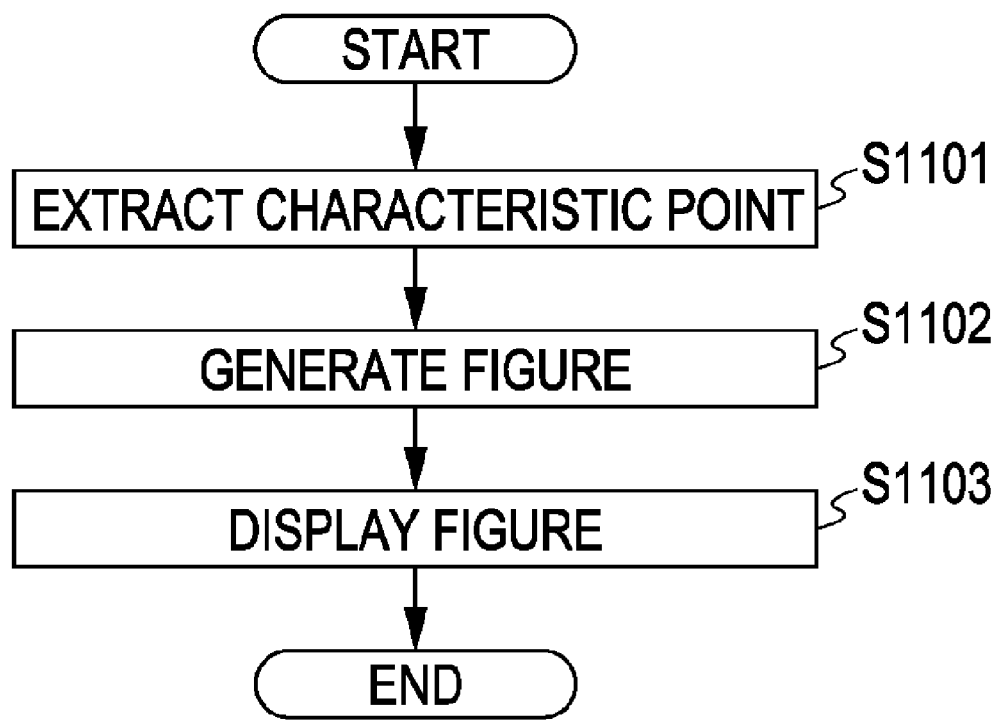
FIG. 11 is a flowchart showing operation of a comprehensive evaluation unit and a generation unit according to the first embodiment.

FIG. 11 is a flowchart for showing the operations of the characteristic quantity extraction unit 106, the generation unit 107, and the display control unit 108. A program for executing the flowchart is held in the ROM 203 or the HDD 205 and executed under the control of the CPU 201.

Figure 12:
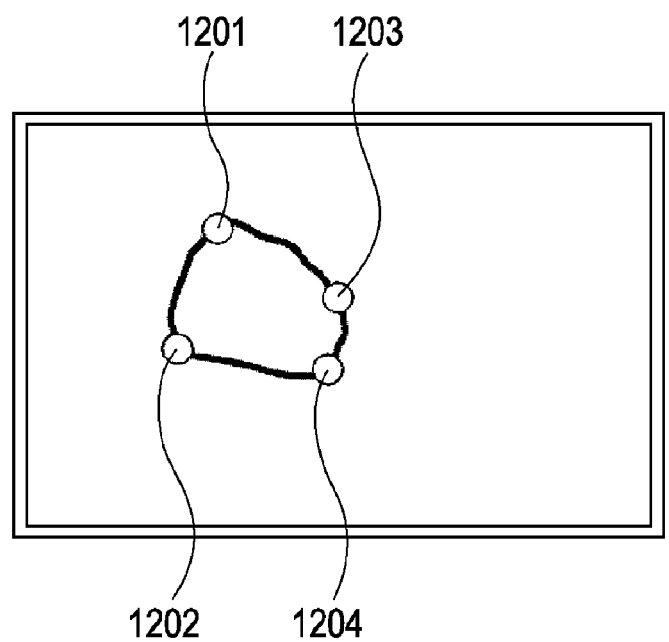
FIG. 12 shows an example of characteristic points found by the comprehensive evaluation unit according to the first embodiment.
Figure 13:
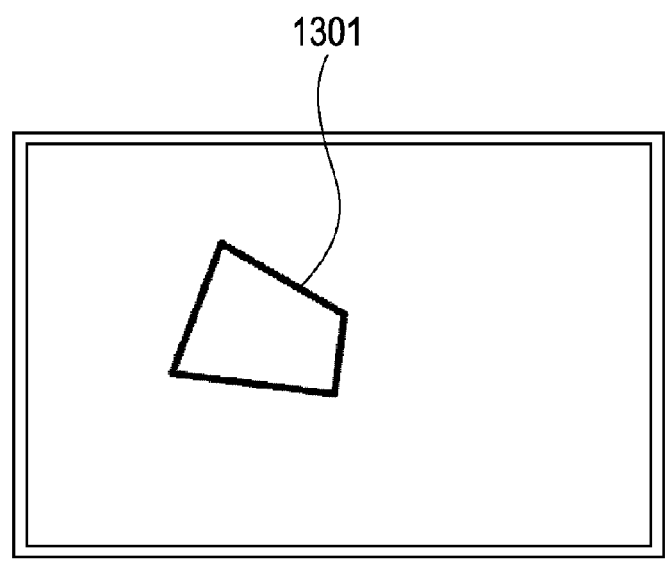
FIG. 13 shows how a figure generated on the basis of input according to the first embodiment is displayed.

In accordance with the figure type determined by the comprehensive evaluation unit 105, characteristic points of the input stroke are extracted in this case. In the case of quadrangle, four apexes 1201 to 1204 of FIG. 12 are found out (S1101). An algorithm for finding out the characteristic points is a known technology. In accordance with the characteristic points, a figure is generated as denoted by reference numeral 1301 of FIG. 13 (S1102), and this figure is displayed (S1103). At the time of the display, the original stroke display is turned off. The shaped figure is stored in the RAM 202 and/or the HDD 205.

In the above-mentioned example, according to the figure recognition from the pen input stroke, the first candidate of the recognition result is "ellipse", which is different from the user's intention. On the other hand, the first candidate of the speech recognition result is "triangle", which is also different from the user's intention. However, both the recognition results are subjected to the comprehensive evaluation, whereby it is possible to shape and display the figure as "quadrangle" while conforming to the user's intention. In this manner, the figure recognition result and the speech recognition result are subjected to the comprehensive evaluation, thereby obtaining an effect of increasing the recognition accuracy in terms of the user's intention.

It should be noted that in this embodiment, the procedure up to the figure generating step has been described, but the procedure only up to the figure type selecting process of FIG. 5 satisfies requirements for the present invention.

Second Embodiment

Figure 14:
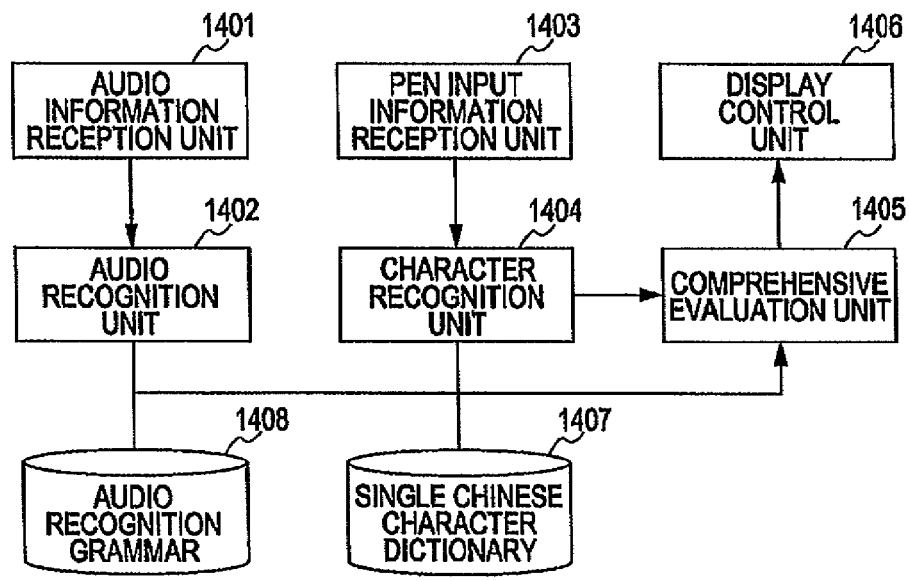
FIG. 14 is a block diagram of an input process in the information processing device according to a second embodiment.

In a second embodiment, a description will be given of a case in which a character is drawn with use of a pen on the touch screen provided by the information processing device and the reading of the character is pronounced at the same time, and the input character is shaped and displayed. FIG. 14 is a block diagram for the input process in the information processing device according to this embodiment. In this drawing, reference numeral 1401 denotes a speech information reception unit. Reference numeral 1402 denotes a speech recognition unit. Reference numeral 1403 denotes a pen input information reception unit. Reference numeral 1404 denotes a character recognition unit. Reference numeral 1405 denotes a comprehensive evaluation unit. Reference numeral 1406 denotes a display control unit for performing a control so as to display the character or the like which is output by the comprehensive evaluation unit 1405. The comprehensive evaluation unit 1407 is a single Chinese character dictionary. Reference numeral 1408 denotes a speech recognition grammar.

Figures 18, 19:
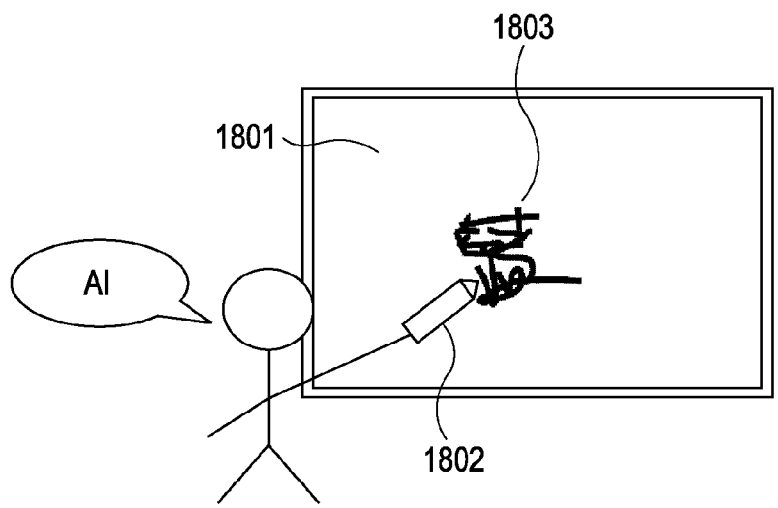
FIG. 18 shows a case in which a user draws a character through handwriting on a touch screen and performs speech input at the same time according to the second embodiment.
FIG. 19 is a flowchart showing an operation of the character recognition unit according to the second embodiment.

The hardware configuration of the information processing device according to the second embodiment is the same as that of FIG. 2. In this embodiment, a case will be considered in which the user draws a character stroke 1803 through handwriting on a touch screen 1801 with use of a pen 1802 and pronounces "ai" at the same time as shown in FIG. 18. It should be noted that in FIG. 18, the user draws the character stroke with an intention to write a Chinese character of "indigo". The Chinese character of "indigo" has the reading of "ai".

Figure 15:
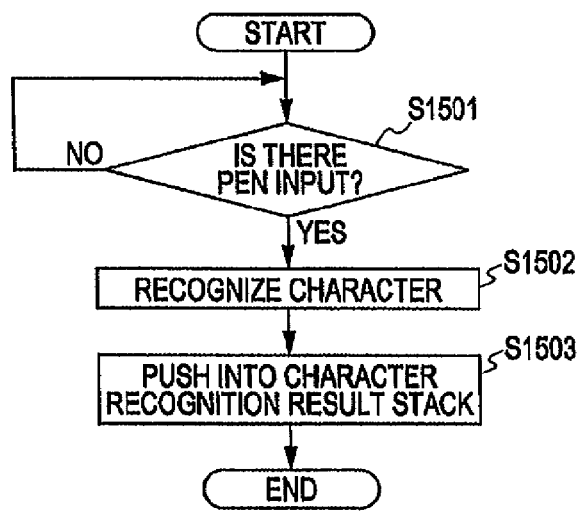
FIG. 15 is a flowchart showing operation of a character recognition unit according to the second embodiment.

FIG. 15 is a flowchart for showing the operations of the pen input information reception unit 1403 and the character recognition unit 1404. A program for executing the flowchart is held in the ROM 203 or the HDD 205 and is executed under the control of the CPU 201.

First of all, it is checked whether or not there is pen input from the user to the touch screen 204 (S1501). When there is pen input, the pen input information reception unit receives pen input information, and then the character recognition unit 1404 recognizes the pen input information as a character (S1502). The recognition result is pushed into a character recognition result stack not shown in the drawing (S1503). The character recognition result stack is held in the RAM 202 or the HDD 205. FIG. 19 shows an example of the character recognition result pushed into the character recognition result stack. In this manner, the character recognition result includes pen input start and end time stamps (1901, 1902) and an N-best candidate 1903 indicating a character type with a confidence score (in this case, N=3). Each character of the recognition result is provided with the reading (or all the readings when there are plural ways to be read). This reading information is obtained from the notation when the character is in katakana phonetic scripts, hiragana phonetic scripts, or alphabets, and obtained from the single Chinese character dictionary 1407 when the character is in Chinese characters (the single Chinese character dictionary can cope with symbols while symbols such as "?" and "#" are treated as one of the Chinese characters).

The operations of the speech information reception unit 1401 and the speech recognition unit 1402 are the same as those in FIG. 4. First, the speech information reception unit checks whether or not there is speech input from the user (S401). Detection of a speech input is a known technology, and the detection is determined on the basis of the magnitude of the input speech or the like. When there is speech input, the speech information is received and phonetically recognized (S402). The speech recognition unit 1402 recognizes the speech on the basis of the speech recognition grammar 1408. The speech recognition grammar 1408 is constructed of a list in which the 50 characters in the Japanese syllabary system and readings of all single Chinese characters included in the single Chinese character dictionary 1407 are gathered without overlap. Therefore, the speech recognition result is one of the 50 characters in the Japanese syllabary system or a reading of a single Chinese character in the single Chinese character dictionary 1407. Then, the recognition result is pushed into the speech recognition result stack not shown in the drawing (S403). The speech recognition result stack is held in the ROM 203 or the HDD 205. FIG. 20 shows an example of the speech recognition result pushed into the speech recognition result stack. In this way, the speech recognition result includes pronunciation start and end time stamps (2001, 2002) and an N-best candidate 2003 indicating a single Chinese reading with a confidence score (in this case, N=3).

Figure 17:
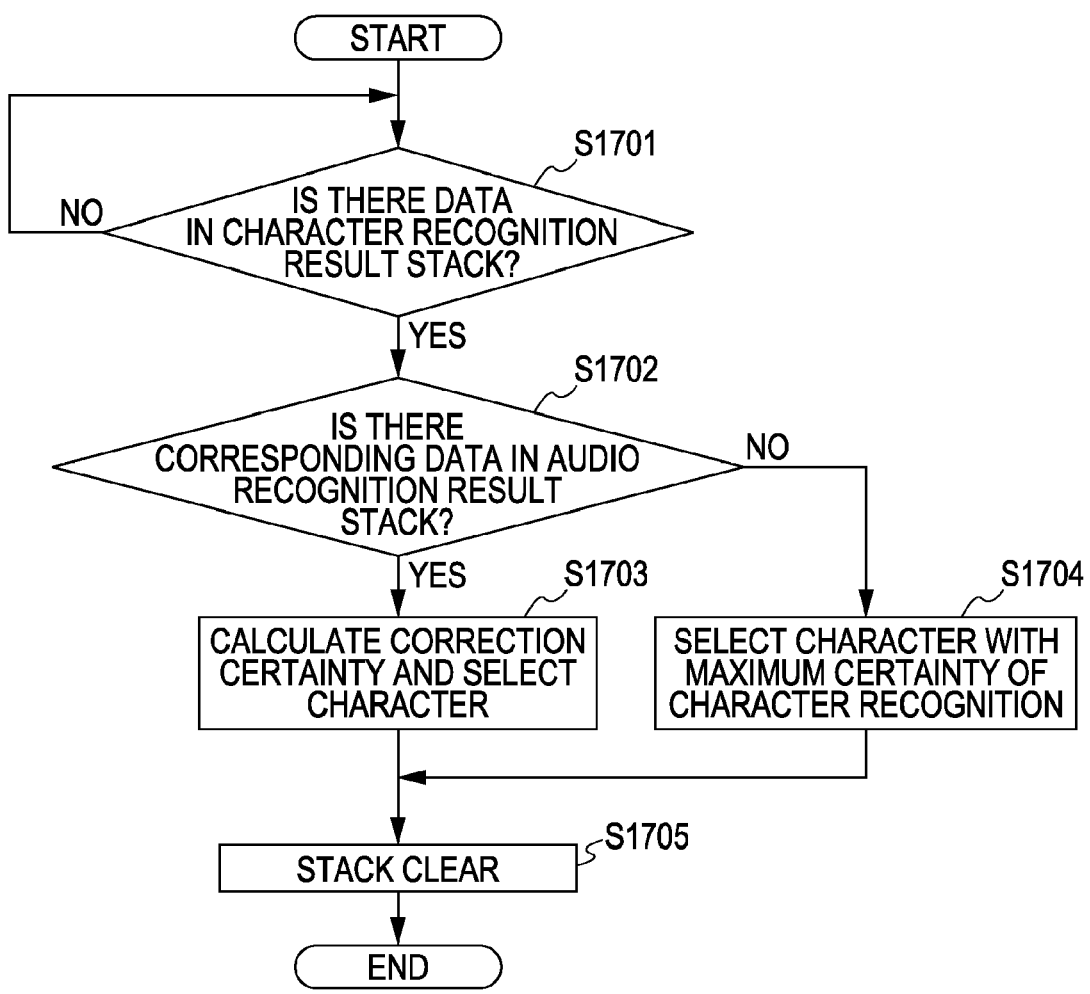
FIG. 17 is a flowchart for showing operation of the comprehensive evaluation unit according to the second embodiment.

FIG. 17 is a flowchart for showing the operation of the comprehensive evaluation unit 1405. A program for executing the flowchart is held in the ROM 203 or the HDD 205 and executed under the control of the CPU 201.

The comprehensive evaluation unit 1405 monitors the character recognition result stack to check whether or not any character recognition result is held in the stack (S1701). If a character recognition result is held, it is checked whether or not the speech recognition result corresponding to this character recognition result is held in the speech recognition result stack (S1702). Herein, the character recognition result stack may be monitored all the time or may be checked periodically. Then, the speech recognition result stack may be monitored instead of the character recognition result stack. Whether or not the speech recognition result corresponds to the character recognition result stack is held is first determined on the time stamps. The determination method is the same as the case of the first embodiment 1.

When the speech recognition result corresponding to the character recognition result stack is found, the confidence score given to each of one or plural character types in the character recognition result is corrected by also using the speech recognition result. The confidence score correction is performed in the following manner. "Monitor" that is the first candidate of the character recognition result has two ways of readings, "kan" and "ken". For the respective readings, similarities for three reading candidates in the speech recognition result, "ei", "sai", and "ai", are calculated. For example, "kan" as the reading of "monitor" and "ei" in the speech recognition result have no constituent phonemes matched to each other at all, so the similarity is 0. Therefore, a corrected recognition confidence score MC("kan" |"ei") of "kan" by "ei" is expresses as follows.

$$MC("kan"|"ei") = C1("kan") + C2("ei")/\text{similarity}$$
$$= 70 + 60/0$$
$$= 70$$

wherein C1: character recognition confidence score, C2: speech character recognition confidence score.

In the case of "kan" and "sai", among three phonemes of "kan", only one phoneme matches "a" of the phonemes in "sai", so the similarity is ⅓=0.33. Therefore, the following expression is obtained.

$MC("kan"|"ai")=70+55/3=88.3$

In the same manner, the following expression is obtained.

$MC("kan"|"ai")=70+30/3=80$

Among the certainties, the maximum value is adopted, and thus the corrected recognition confidence score MC("kan") of "kan" is 88.3. With respect to the other reading of "monitor", "ken", the corrected recognition confidence score MC("ken") is similarly obtained, which is 70+60/3=90. The corrected recognition confidence score MC("monitor") of the character "monitor" adopts the maximum value among these certainties, and the following expression is obtained.

$MC("monitor")=90$

In the same manner, the following expressions are obtained.

$MC("orchid")=50+55/3=68.3$ $MC("indigo")=40+55/1.0=95$

The corrected recognition confidence score is obtained as in the above-mentioned manner, the character "indigo" with the maximum corrected recognition confidence score is selected as the final recognition result (S1703). It should be noted that in S1702, if there is no corresponding speech recognition result, a character with the maximum confidence score is selected among one or plural characters in the character recognition result (S1704). After that, the selected character is determined as the adopted character.

Figure 22:
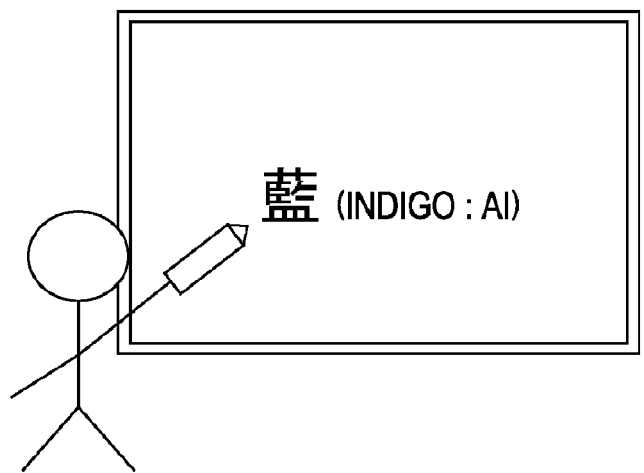
FIG. 22 shows a case in which a character recognized on the basis of an input according to the second embodiment is displayed in an arbitrary font.

As in the above-mentioned manner, the process for selecting one character among the one or plural characters in the character recognition result is completed, and the character recognition result stack and the speech recognition result stack are all cleared (S1705). As the result of the above-mentioned process, the character is determined as "indigo" on the basis of the comprehensive evaluation result as shown in FIG. 21, and the character "indigo" is displayed in an arbitrary font as shown in FIG. 22. The selected character is stored in the RAM or the HDD.

In the above-mentioned example, according to the character recognition based on the pen input stroke, the first candidate of the recognition result is "monitor", which is different from the user's intention. On the other hand, the first candidate of the speech recognition result is "ei", which is also different from the user's intention. However, both the recognition results are subjected to the comprehensive evaluation, whereby it is possible to display the character "indigo" while conforming to the user's intention. In this manner, the character recognition result and the speech recognition result are subjected to the comprehensive evaluation, thereby obtaining an effect of increasing the recognition accuracy in terms of the user's intention.

Third Embodiment

In the above-mentioned embodiment, when the pen input time stamp is in the input period D of the input speech, the speech recognition result and the figure recognition result or the character recognition result are associated with each other, but the present invention is not limited to the above. For a user who is not good at pronouncing while writing, it is also considerable that a case is more convenient in which the pronunciation is performed after the writing is finished. For that reason, in this embodiment, the speech pronounced after completion of the pen input is associated with the pen input. To be specific, a time stamp of the pen input is recorded, and a speech input after time indicated by the time stamp is associated with the pen input. Herein, a limitation in which the speech input is only associated with the pen input in a predetermined time after the completion of the pen input may be provided. In contrast to this, of course, a pen input which is made after a speech input is finished may be associated with the speech.

With such a configuration, there can be the embodiment in which the speech corresponding to the figure or character that is input after the pen input is pronounced and the embodiment in which the corresponding figure or character is input with use of the pen after the pronunciation.

Fourth Embodiment

In the above-mentioned embodiment, although not clearly indicated, the example has been described in which the pen input and the speech input are subjected to the comprehensive evaluation each time, but the present invention is not limited to the above. Alternatively, a process for subjecting the pen input to the figure recognition or the character recognition to display the recognized result can be repeatedly performed, and when the user determines that the recognized result is incorrect, the speech input is performed to thereby shape the figure or character.

Figure 16:
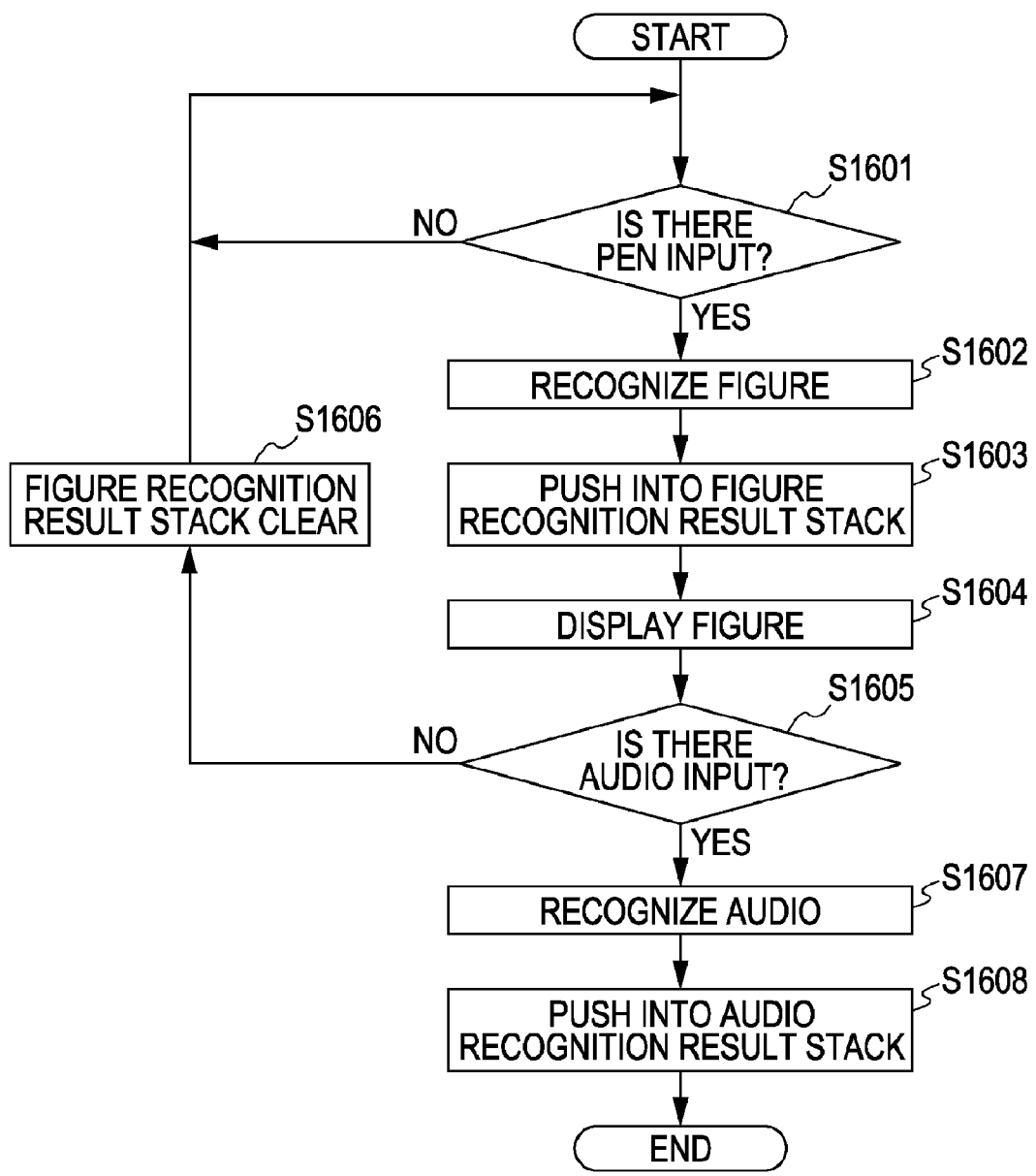
FIG. 16 is a flowchart for figure recognition process according to a fourth embodiment.

FIG. 16 is a flowchart for the process in this case. A program for executing the flowchart is held in the ROM 203 or the HDD 205 and executed under the control of the CPU 201. An example of recognizing the figure is described in this case.

First of all, it is checked whether or not there is pen input from the user (S1601). When there is pen input, the figure is recognized from the pen stroke (S1602). The recognition result is then pushed into the figure recognition result stack (S1603). After that, the figure with the maximum confidence score as the result of the recognition is displayed (S1604). At this time, the user confirms the displayed figure. When the figure is the same as the intended figure, no speech is input. Then, NO is determined in S1605, the figure recognition result is cleared (S1606), and the flow returns to S1601. It should be noted that the timing for clearing the figure recognition result stack may be at a timing when the next pen input is started, or the stack may be cleared after elapse of given time.

As a result of the figure confirmation by the user, when the user determines that the figure is different from the intended figure, the user performs pronunciation to correct the figure into the intended figure. The present system accepts the pronunciation (S1605), the accepted pronunciation is phonetically recognized, (S1607), and the speech recognition result is pushed into the speech recognition result stack (S1608). The subsequent process is the same as that of FIG. 5.

It should be noted that when the pen input is continuously performed instead of performing the pen input for one character each, the user may input the next figure before noticing that the previous input is incorrect. For that reason, it may be considered that in the figure displayed in S1604, the figure that is to be corrected is specified, and the intended figure name is pronounced with respect to the figure.

With such a configuration, from the viewpoint of the user, basically the figure input with use of a pen is shaped, and when it is determined that the figure is incorrect, the name of the intended figure is pronounced, thereby making it possible to correct the figure into the desired figure.

It should be noted that the description has been given of the example in which the input is performed by using the pen, and when the input is incorrect, the speech input is performed in the above. As an alternative, the input can be performed by using the speech, and when the input is incorrect, the correction may be performed by the pen input.

In addition, a description has been given of the example of inputting the figure in the above. However, of course the present invention can be applied to the case in which the character is input similarly to the second embodiment.

Fifth Embodiment

In the above-mentioned embodiment, a description has been given of the case in which the pronunciation is performed when the pen input is conducted, but the present invention is not limited to the above. The present invention is also applicable to the case in which when a handwritten paper document or the like is read by scanning, the written content is shaped.

Figure 24:
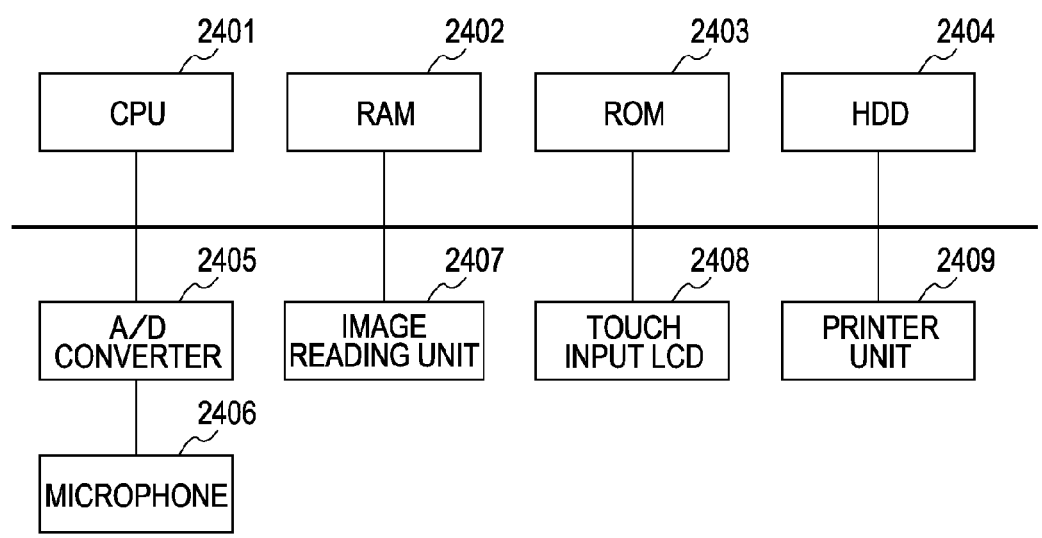
FIG. 24 is a hardware configuration diagram of a multifunctional device according to a fifth embodiment.

In this embodiment, a multifunctional device having a function of scanning a sheet of paper on which a plurality of handwritten figures are formed, and shaping the scanned figures will be described as an example. FIG. 24 is a hardware configuration diagram of a multifunctional device according to this embodiment. Reference numerals 2401, 2402, 2403 and 2404 denote a CPU, a RAM, a ROM, and a hard disc drive, respectively. Reference numeral 2405 denotes an A/D converter for converting the input speech into a digital signal. Reference numeral 2406 denotes a microphone. Reference numeral 2407 denotes an image reading unit for reading out information from the sheet of paper. Reference numeral 2408 denotes a touch screen. Reference numeral 2409 denotes a printer unit.

Figure 25:
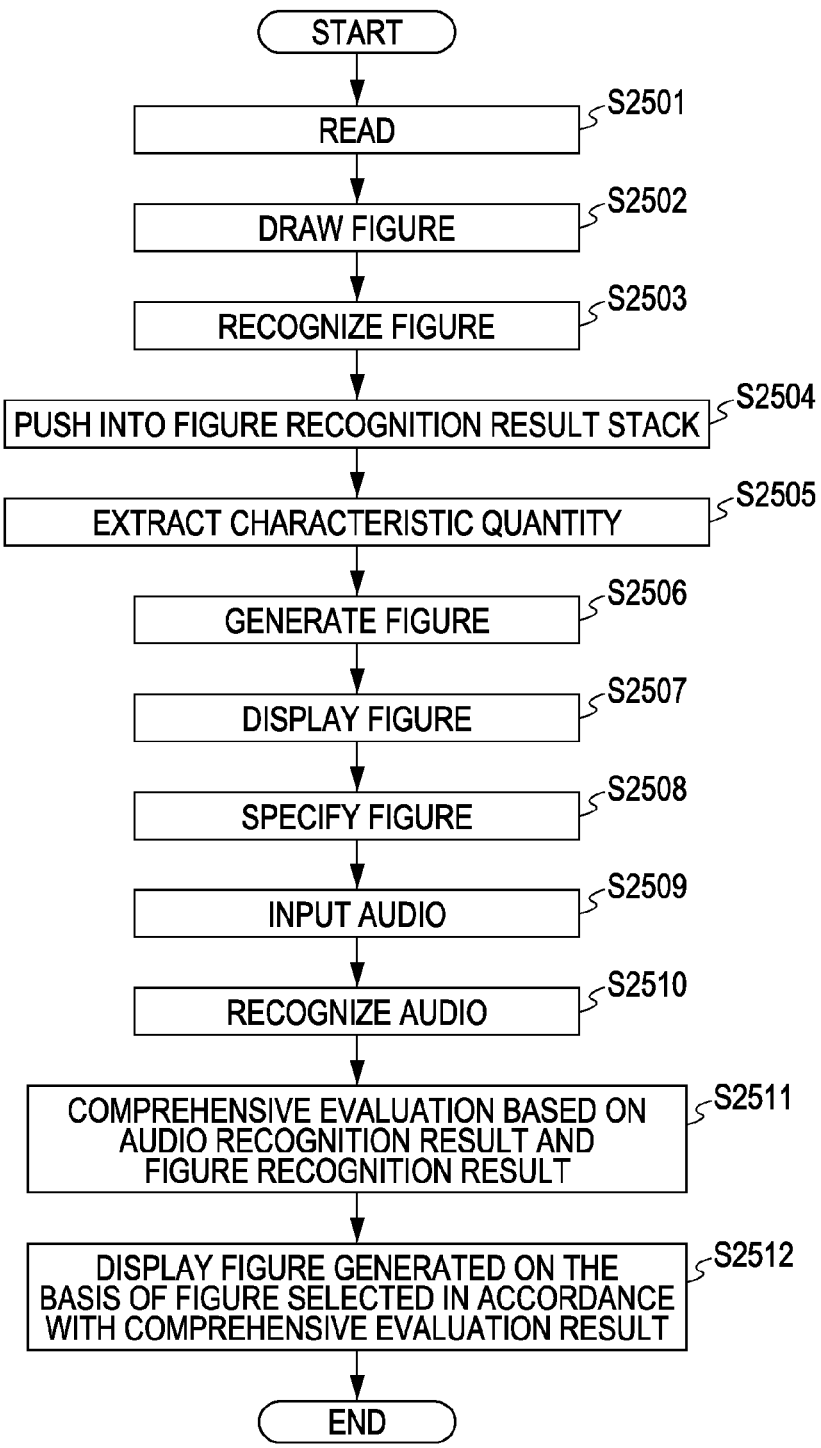
FIG. 25 is a flowchart for a figure generating process according to the fifth embodiment.

FIG. 25 is a flowchart for showing a process flow according to this embodiment. A program for executing the flowchart is held in the ROM 203 or the HDD 205 and executed under the control of the CPU 201. First, the image reading unit 2407 reads out a sheet of paper on which a plurality of handwritten figures are drawn to convert the information into image data (S2501). After that, figures are extracted from the image data (S2502). The extracted figures are subjected to figure recognition (S2503), and the recognition results are pushed into the figure recognition result stack (S2504). From the recognition results, a figure with the maximum confidence score is selected, and a characteristic quantity is extracted from the figure extracted in S2503 on the basis of the selected figure (S2505). A figure is generated on the basis of the extracted characteristic quantity (S2506), and the figure is displayed on the touch screen 2408 (S2507). As a plurality of figures are drawn on the read sheet, a plurality of figures are displayed in this case. The user confirms the displayed figures and if there is an unintended figure, the figure is specified. Herein, the displayed figures are directly specified on the touch screen. The multifunctional device determines that the figures instructed by the user are specified (S2508). The user pronounces the intended figure, and then the multifunctional device receives this pronunciation as input speech (S2509). After the received speech is recognized (S2510), the speech recognition result and the figure recognition result pushed into the figure recognition result stack in S2504 are subjected to the comprehensive evaluation (S2511). The comprehensive evaluation process is the same as that of the first embodiment. On the basis of the figure selected as a result of the comprehensive evaluation, the characteristic quantity is extracted from the figure extracted in S2503, the characteristic quantity is used to generate a figure, and the generated figure is displayed (S2512).

With the above-mentioned configuration, not only the real-time pen input but also the previously drawn figures can be corrected into an intended figure with use of the speech. It should be noted that characters may of course be the targets as in the second embodiment.

Sixth Embodiment

According to the second embodiment, the recognition of one character is dealt with, but the present invention can be applied to the case of recognizing a phrase of two or more characters at once. In that case, a phrase dictionary is used instead of the single Chinese character dictionary 1407, and the speech recognition grammar 1408 is composed of a list in which readings of the phrase are gathered without overlap. The phrase dictionary holds pair data of various phrase notations and the readings. Then, the character recognition unit 1404 recognizes a plurality of characters and searches the phrase dictionary with the recognized character string to obtain the reading. After that, the result including the reading information is pushed into the character recognition stack. Subsequently, the same algorithm as in the second embodiment can deal with the process.

With the above-mentioned configuration, not only the recognition accuracy for the one character but also the recognition accuracy for the phrase can be improved.

Seventh Embodiment

Figure 23:
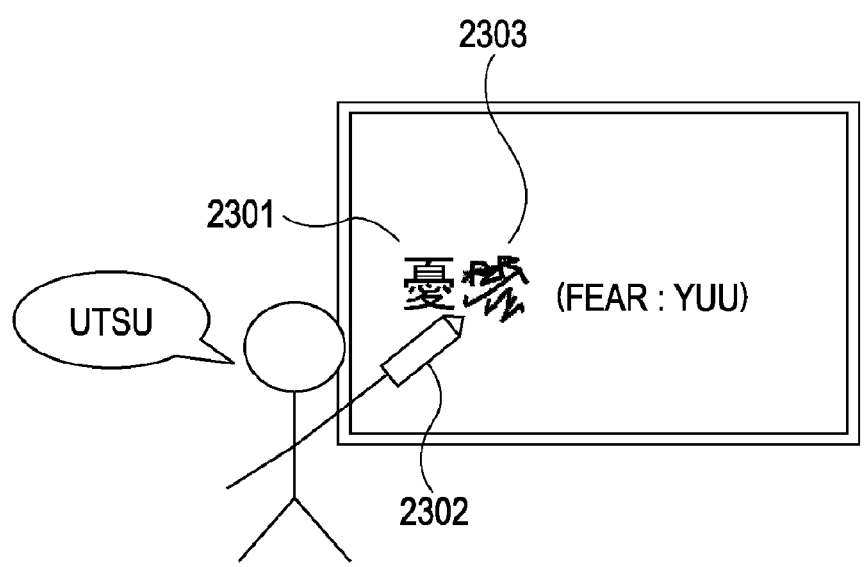
FIG. 23 shows a case in which a user draws a character through handwriting on a touch screen and performs speech input at the same time according to the fourth embodiment.

According to the sixth embodiment, a description has been given of the case in which a plurality of characters are recognized at once. However, as an alternative, a plurality of characters may recognize one character at a time by using the method according to the second embodiment to confirm the result, and then the next character may be recognized. In this case, the confirmation of the recognition result for each character is performed by pressing a predetermined button, for example mounted on the information processing device. Moreover, when one character is to be recognized, the recognition result of the confirmed character immediately before the one character are used. For that reason, the configuration of FIG. 14 further includes a phrase dictionary. A description will be given of the case in which a phrase "melancholy" (made of a two character combination, "fear" and "depression") is written on the touch screen. The reading of "melancholy" is "yuuutsu", and the reading of "fear" is "yuu" and that of "depression" is "utsu". First, the user pronounces "yuu" while writing the character "fear" with use of a pen, and the character "fear" is input through the method according to the second embodiment. After the confirmation with a confirm button, the character "fear" is displayed in an arbitrary font on the touch screen. At right next to the character, while writing such a stroke denoted by reference numeral 2303 in FIG. 23 with use of the pen on an intention to write the character "depression", the user pronounces "utsu". Before this handwritten character is recognized by the comprehensive evaluation based on the character recognition and the speech recognition, a phrase starting with the character "fear" placed immediately before is searched for from the phrase dictionary. Then, the search results of "melancholy (yuu/utsu)", "patriotism (yuu/koku)", "somberness (yuu/shuu)", "gloomy (yuu/shoku)", and "concernment (yuu/ryo)" are obtained. Thus, the second character is likely to be "depression (utsu)", "country (koku)", "sorrow (shuu)", "color (shoku)", and "thought (ryo)". Among the recognition vocabulary in the speech recognition grammar 1408, weights of "utsu", "koku", "shuu", "shoku", and "ryo" are increased, and those characters are facilitated to be picked up as the recognition results. On the other hand, the character recognition unit 1404 also puts an appropriate weight on the stroke 2303 to pick up the characters like "depression", "country", "sorrow", "color", and "thought" as the recognition results for the recognition. With such a configuration, an effect of obtaining the plausible recognition result in term of "phrase" is obtained.

Eighth Embodiment

According to the second embodiment, the speech recognition unit 1402 performs the speech recognition on the basis of the speech recognition grammar 1408. The speech recognition grammar 1408 is composed of the list in which the 50-character Japanese syllabary and the readings of all the single Chinese characters in the single Chinese character dictionary 1407 are gathered without overlap. However, the present invention is not limited to the above. A serial speech recognition grammar for accepting a combination of any phonemes is prepared as the speech recognition grammar 1408, and the speech recognition unit 1402 is allowed to perform a serial speech recognition process. Thus, the unit may recognize arbitrary phoneme string without a limitation to the readings of the single Chinese characters in the single Chinese character dictionary 1407.

Ninth Embodiment

According to the second embodiment, the speech recognition unit 1402 performs the speech recognition independently from the recognition process of the character recognition unit 1404. In contrast to this, the following configuration may also be adopted. The recognition of the character recognition unit 1404 is waited for, and a list of the reading of the character included in the N-best candidate list. In order that the reading is likely to be picked up in the speech recognition result, an appropriate weight is put on the speech recognition grammar 1408 to perform the speech recognition process. For example, when the character recognition result as shown in FIG. 19 is obtained, weighting may be performed so that "kan", "ken", "ran", and "ai" are likely to be picked up in the speech recognition result.

Tenth Embodiment

In contrast to the ninth embodiment, the following configuration may also be adopted. The recognition result of the speech recognition unit 1402 is waited for, and a list of the reading of the character included in the N-best. In order that the character having the reading is likely to be picked up in the character recognition result, an appropriate weight is put on the character recognition unit 1404 to perform the process. For example, when the speech recognition result as shown in FIG. 20 is obtained, weighting may be performed so that characters having the readings "ei", "ai" and "sai" are likely to be picked up in the character recognition result.

Eleventh Embodiment

In the above-mentioned embodiment, the example has been described as an example in which when the speech recognition result and the figure recognition result or the character recognition result are subjected to the comprehensive evaluation, the certainties are summed, but it may also be possible to further perform the weighting on the results.

For example, when the process is performed in a loud surrounding noise environment, it is considerable that the accuracy of the speech recognition is decreased due to the noise influence. In view of the above, the surrounding noise is detected, and a weight on the speech recognition result may be adjusted according to the magnitude of the surrounding noise. When the noise level is high, if the weight on the speech recognition result is reduced, it is possible to reduce the noise influence. As an embodiment mode, for example, the configuration of FIG. 1 further includes a noise detection unit (not shown) for detecting the noise, and the noise detected by the noise detection unit is received by the comprehensive evaluation unit 105. When the comprehensive evaluation is conducted, the weight on the speech recognition result may be adjusted according to the received noise magnitude.

Also, in the case of input by a pointing device such as a pen, when the input speed is high, a hypothesis that the written figure or character is rough can be set up. Therefore, it is considered that the pen input speed is detected, and the weight on the figure recognition result or the character recognition result is adjusted according to the input speed. When the speed is high, the weight on the figure recognition result or the character recognition result is reduced, whereby improvement in the overall recognition accuracy can be expected. As an embodiment mode, for example, the configuration of FIG. 1 further includes a pen input speed detection unit (not shown) for detecting the pen input speed, and the pen input speed detected by the pen input speed detection unit is received by the comprehensive evaluation unit 105. When the comprehensive evaluation is conducted, the weight on the figure recognition result or the character recognition result may be adjusted according to the received pen input speed.

Twelfth Embodiment

In the above-mentioned embodiment, the description has been given of the example in which the figure recognition or the character recognition and the speech recognition are subjected to a comprehensive evaluation, but the target may be a face recognition or a gesture recognition. Specifically, in order to identify a person, pronunciation of a name is phonetically recognized, and the comprehensive evaluation is conducted along with the face recognition, it is possible to increase the recognition rate of the person. Also, while performing a gesture, a speech utterance corresponding to the gesture is pronounced, thereby making it possible to increase the recognition rate of the gesture.

Thirteenth Embodiment

It should be noted that the present invention can be realized as follows. That is, a storage medium that stores a program code of a software for realizing the above-mentioned functions of the embodiments is supplied to the system or device. Then, a computer of the system or device (alternatively, a CPU or an MPU) reads out and executes the program code stored in the storage medium. In this way as well, the present invention can be realized of course.

In this case, the program code itself that is read out from the storage medium realizes the above-mentioned function of the embodiments, and therefore the storage medium that stores the program code constitutes the present invention.

For example, a flexible disc, a hard disk drive, an optical disc, an optomagnetic disc, a CD-ROM, a CD-R, a magnetic tape, a nonvolatile memory card, a ROM, etc., can be used as the storage medium for supplying the program code.

In addition, the embodiments according to the present invention are not limited to the case in which the program code read out by the computer is executed to realize the above-mentioned function of the embodiments. For example, on the basis of an instruction of the program code, an operation system (OS) running on the computer or the like performs a part or an entirety of the actual process, and the above-mentioned functions of the embodiments are realized by the process. Of course, this case is in the scope of the present invention as well.

Moreover, the functions of the embodiments according to the present invention can be realized in the following manner. That is, the program code read out from the storage medium is written to a memory provided in a function extension board inserted to the computer or a function extension unit connected to the computer. Then, on the basis of an instruction of the program code, a CPU provided to the function extension board or the function extension unit performs a part or an entirety of the actual process. Of course, the above-mentioned functions of the embodiments are realized by the process.

In the above description, a combination of the program and the hardware realizes the invention, but the weight on the program may be reduced and the use of the hardware may be increased. Furthermore, the flow from the input step to the output step has been described in the embodiments, but the present invention is applicable to a part of the embodiments.

Furthermore, in the above-mentioned embodiment, as the step of the information processing method, the example including the speech recognition step and the example including the figure recognition step or the character recognition step are given for the description, but the present invention is not limited to the above. Instead of performing the recognition such as the speech recognition, the figure recognition, or the character recognition, a flow including a step of receiving the recognition result and a step of performing a process on the received recognition result may be realized. If the OS receives the results of the speech recognition, the figure recognition, the character recognition, and the like, and includes a step of performing the comprehensive evaluation on those results, the present invention can be executed.

In the present invention, the given target is a target of the pattern recognition such as the figure recognition or the character recognition, for example, the figure drawn with the pen of the first embodiment, the character drawn with the pen of the second embodiment, or the scanned figure of the fifth embodiment. The figure recognition unit is, for example, the figure recognition unit 104 according to the first embodiment. The speech recognition unit is, for example, the speech recognition unit 102 according to the first embodiment. The selection unit in the above-mentioned embodiment selects the figure or the character from the result of the comprehensive evaluation. The extraction unit is, for example, the characteristic quantity extraction unit 106 according to the first embodiment. The generation unit is, for example, the generation unit 107 according to the first embodiment. The display control unit is, for example, the display control unit 108 according to the first embodiment. The confidence score is a value indicating the degree for assurance in that the candidates obtained as the result of the recognition are the respective targets, for example, the values shown in FIG. 7. The character recognition unit is, for example, the character recognition unit 1404 according to the second embodiment. The information for identifying the pattern is the figure name/type in the case of the figure, and the character reading in the case of the character. The figure type is the information indicating a variation of the figure, in other words, the name of the figure or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-234032 filed Aug. 12, 2005, which is hereby incorporated by reference herein in its entirety.

What is claimed is:

1. An information processing device, comprising:
   a figure recognition unit adapted to obtain a figure candidate through figure recognition performed on a given target;
   a speech recognition unit adapted to obtain a figure candidate through speech recognition performed on input speech information;
   a selection unit adapted to select a figure on the basis of the figure candidate obtained by the figure recognition unit and the figure candidate obtained by the speech recognition unit;
   an extraction unit adapted to extract a characteristic Quantity from the given target on the basis of the figure selected by the selection unit;
   a generation unit adapted to generate the figure selected by the selection unit on the basis of the characteristic quantity extracted by the extraction unit; and
   a display control unit adapted to perform a control to display the figure generated by the generation unit.

2. The information processing device according to claim 1, wherein:
   the figure recognition unit obtains a confidence score indicating the degree of assurance in that the figure candidate and the respective candidates are the target figures;
   the speech recognition unit obtains a confidence score indicating the degree of assurance in that the figure candidate and the respective candidates are the target figures; and
   the selection unit adds the corresponding certainties of the figure candidate obtained by the figure recognition unit and the figure candidate obtained by the speech recognition unit and selects the figure on the basis of the resultant confidence score.

3. The information processing device according to claim 2, further comprising:
   a detecting unit adapted to detect a degree of noise in the speech information,
   wherein the selection unit puts a weight on the confidence score of the figure candidate obtained by the speech recognition unit according to the degree of noise and increases the confidence score accordingly.

4. The information processing device according to claim 2, further comprising:
   a reception unit adapted to receive an input from a pointing device; and
   a detection unit adapted to detect a speed of the input from the pointing device, wherein:
   the given target comprises the input from the pointing device received by the reception unit; and
   the selection unit puts a weight on the confidence score of the figure candidate obtained by the figure recognition unit according to the speed of the input from the pointing device detected by the detection unit and increases the confidence score accordingly.

5. An information processing device, comprising:
   a character recognition unit adapted to obtain a character candidate through character recognition performed on a given target;
   a speech recognition unit adapted to obtain a character candidate through speech recognition performed on input speech information; and
   a selection unit adapted to select a character on the basis of the character candidate obtained by the character recognition unit and the character candidate obtained by the speech recognition unit;
   a phrase dictionary including a combination of a notation and a reading of a phrase;
   a display control unit adapted to control the character selected by the selection unit to be displayed at a position corresponding to the given target;
   a confirmation unit adapted to confirm the character displayed by the display control unit;
   a reception unit adapted to receive the given target and the speech information after one or plural characters have been confirmed;
   a search unit adapted to search the phrase dictionary for a phrase having the confirmed one or plural characters partially matched with the notation;
   a subsequent character obtaining unit adapted to obtain a subsequent character of the confirmed one or plural characters in the notation of one or plural phrases searched by the search unit;

a second character recognition unit adapted to subject successive coordinate information received by the reception unit to character recognition with respect to the subsequent character obtained by the subsequent character obtaining unit so that the subsequent character is facilitated to be included in the recognition result;

a second speech recognition unit adapted to phonetically recognize the speech information received by the reception unit so that the subsequent character is facilitated to be included in the recognition result;

a second selection unit adapted to select a character on the basis of the character candidate obtained by the second character recognition unit and the character reading candidate obtained by the second speech recognition unit; and a second display control unit adapted to control the character selected by the second selection unit to be displayed at the position corresponding to the coordinate information.

6. The information processing device according to claim 5, wherein:

the character recognition unit obtains a confidence score indicating the degree of assurance in that the figure candidate and the respective candidates are the target figures and at least one of reading information for each candidate;

the speech recognition unit obtains a confidence score indicating the degree of assurance in that the figure candidate and the respective candidates are the target figures; and the selection unit comprises: a first calculation unit adapted to calculate, for each character candidate included in a character recognition result, a similarity between a reading given to the character candidate and the respective readings in the character recognition result; and a second calculation unit adapted to calculate a corrected recognition confidence score on the basis of the original confidence score of the character candidate, the similarity, and the confidence score of the reading obtained by the speech recognition unit, and determines the character with the maximum corrected recognition confidence score as the selection result.

7. An information processing method, configured to be performed by an information processing apparatus including a processor, the information processing method comprising:

a figure recognition result obtaining step of obtaining a figure candidate that is a result of performing figure recognition on a given target;

a speech recognition result obtaining step of obtaining a figure candidate that is a result of phonetically recognizing speech information;

a selection step of selecting a figure on the basis of the figure candidate obtained in the figure recognition result obtaining step and the figure candidate obtained in the speech recognition result obtaining step;

an extraction step of extracting a characteristic quantity from the given target on the basis of the figure selected in the selection step;

a generation step, performed by the processor, of generating the figure selected in the selection step on the basis of the characteristic quantity extracted in the extraction step; and a display control step of performing a control to display the figure generated in the generation step.

8. An information processing method configured to be performed by an information processing apparatus including a processor, the information processing method, comprising:

a character recognition result obtaining step of obtaining a character candidate that is a result of performing character recognition on a given target;

a speech recognition result obtaining step of obtaining a character reading candidate that is a result of phonetically recognizing speech information; and a selection step of selecting a character on the basis of the character candidate obtained in the character recognition result obtaining step and the character reading candidate obtained in the speech recognition result obtaining step;

a display control step of controlling the character selected in the selection step to be displayed at a position corresponding to the given target;

a confirmation step of confirming the character displayed in the display control step;

a reception step of receiving the given target and the speech information after one or plural characters have been confirmed;

a search step, performed by the processor, of searching a phrase dictionary for a phrase having the confirmed one or plural characters partially matched with the notation, the phrase dictionary including a combination of a notation and a reading of a phrase;

a subsequent character obtaining step of obtaining a subsequent character of the confirmed one or plural characters in the notation of one or plural phrases searched in the search step;

a second character recognition step of subjecting successive coordinate information received in the reception step to character recognition with respect to the subsequent character obtained in the subsequent character obtaining step so that the subsequent character is facilitated to be included in the recognition result;

a second speech recognition step of phonetically recognizing the speech information received in the reception step so that the subsequent character is facilitated to be included in the recognition result;

a second selection step of selecting a character based on the character candidate obtained in the second character recognition step and the character reading candidate obtained in the second speech recognition step; and a second display control step of controlling the character selected in the second selection step to be displayed at the position corresponding to the coordinate information.

9. A computer readable medium having stored thereon a control program for causing a computer to execute an information processing method, the information processing method comprising:

a figure recognition result obtaining step of obtaining a figure candidate that is a result of performing figure recognition on a given target;

a speech recognition result obtaining step of obtaining a figure candidate that is a result of phonetically recognizing speech information; and a selection step of selecting a figure on the basis of the figure candidate obtained in the figure recognition result obtaining step and the figure candidate obtained in the speech recognition result obtaining step an extraction step of extracting a characteristic quantity from the given target on the basis of the figure selected in the selection step;

a generation step of generating the figure selected in the selection step on the basis of the characteristic quantity extracted in the extraction step; and a display control step of performing a control to display the figure generated in the generation step.

10. A computer-readable medium having stored thereon a control program for causing a computer to execute an information processing method, the information processing method, comprising:

a character recognition result obtaining step of obtaining a character candidate that is a result of performing character recognition on a given target;

a speech recognition result obtaining step of obtaining a character reading candidate that is a result of phonetically recognizing speech information; and a selection step of selecting a character on the basis of the character candidate obtained in the character recognition result obtaining step and the character reading candidate obtained in the speech recognition result obtaining step;

a display control step of controlling the character selected in the selection step to be displayed at a position corresponding to the given target;

a confirmation step of confirming the character displayed in the display control step;

a reception step of receiving the given target and the speech information after one or plural characters have been confirmed;

a search step of searching a phrase dictionary for a phrase having the confirmed one or plural characters partially matched with the notation, the phrase dictionary including a combination of a notation and a reading of a phrase;

a subsequent character obtaining step of obtaining a subsequent character of the confirmed one or plural characters in the notation of one or plural phrases searched in the search step;

a second character recognition step of subjecting successive coordinate information received by the reception unit to character recognition with respect to the subsequent character obtained in the subsequent character obtaining step so that the subsequent character is facilitated to be included in the recognition a second speech recognition step of phonetically recognizing the speech information received in the reception step so that the subsequent character is facilitated to be included in the recognition result;

a second selection step of selecting a character based on the character candidate obtained in the second character recognition step and the character reading candidate obtained in the second speech recognition step; and a second display control step of controlling the character selected in the second selection step to be displayed at the position corresponding to the coordinate information.

\* \* \* \* \*